Dec. 29, 1931.  W. P. KELLETT  1,838,842
FREIGHT HANDLING TRUCK
Filed Feb. 4, 1929   3 Sheets-Sheet 1

Inventor.
William Platts Kellett.
by
A. J. S. Dennison
atty.

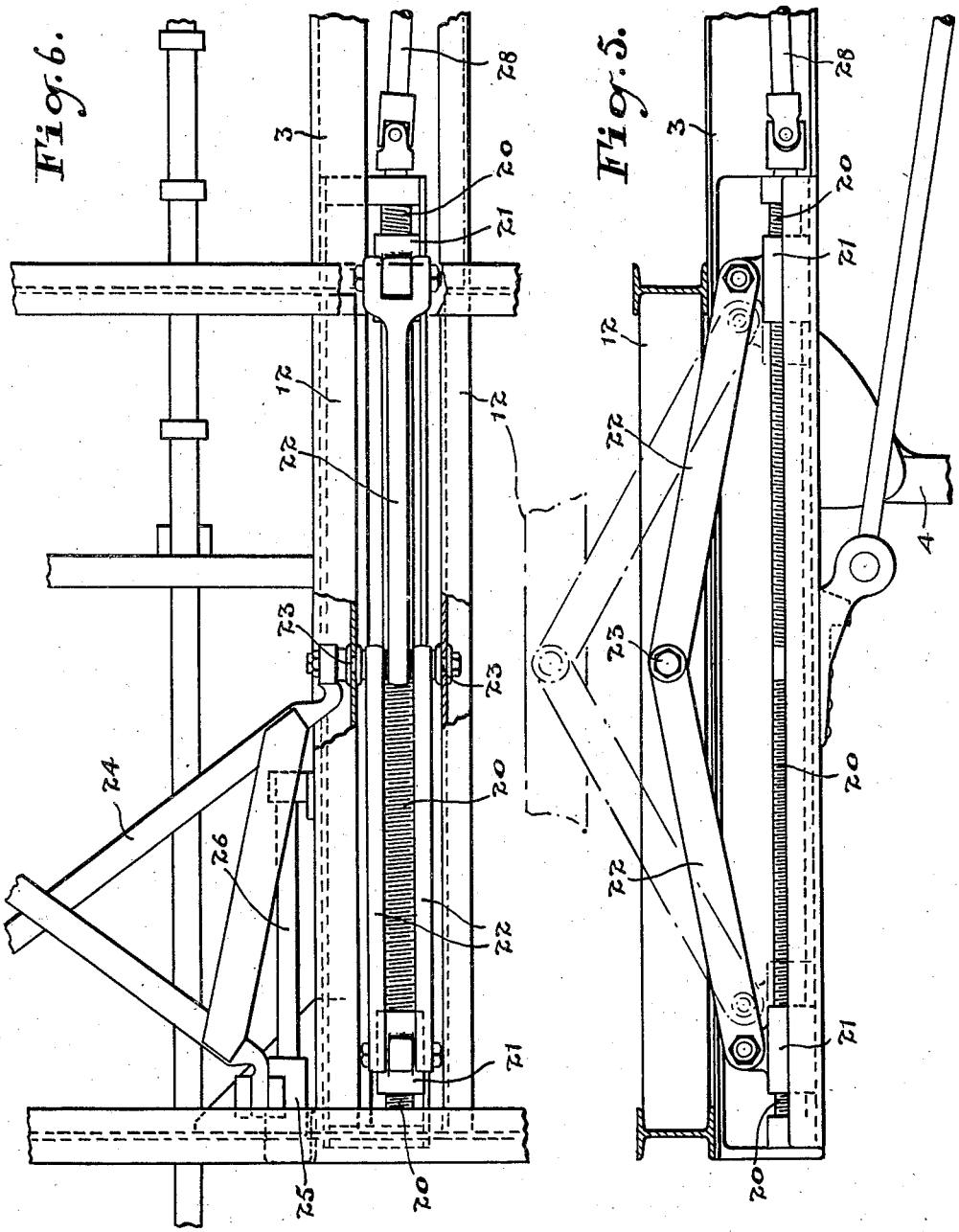

Patented Dec. 29, 1931

1,838,842

UNITED STATES PATENT OFFICE

WILLIAM PLATTS KELLETT, OF NEW YORK, N. Y.

FREIGHT HANDLING TRUCK

Application filed February 4, 1929. Serial No. 337,414.

The principal objects of this invention are to provide a truck or semi-trailer which will be adapted to facilitate the transfer of "roll off" freight containers between highway trucks and railroad cars, the truck being capable of assisting in the placing or removal of the containers.

The principal feature of the invention consists in the novel construction of a truck with a platform super-structure arranged above the chassis and supported upon means capable of elevating the same either parallel to or at an angle with the chassis.

In the accompanying drawings, Figure 1 is a side elevational view of my improved truck showing a pair of containers mounted thereon.

Figure 5 is an enlarged side elevational view of the toggle mechanism for lifting the superposed frame.

Figure 6 is a plan view of one of the toggle members as shown in Figure 5 and a portion of the transverse brace member, parts of the frame being broken away.

Figure 2:
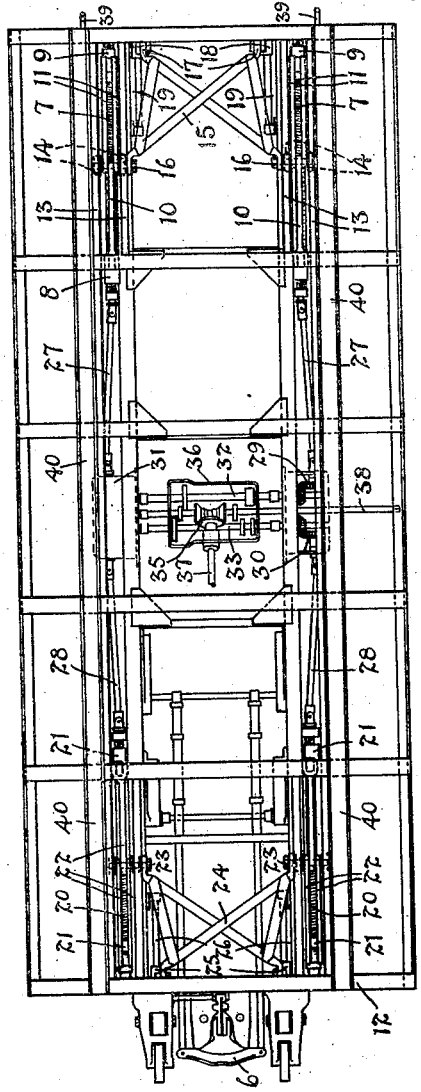
Figure 2 is a plan view of the truck.
Figure 1:
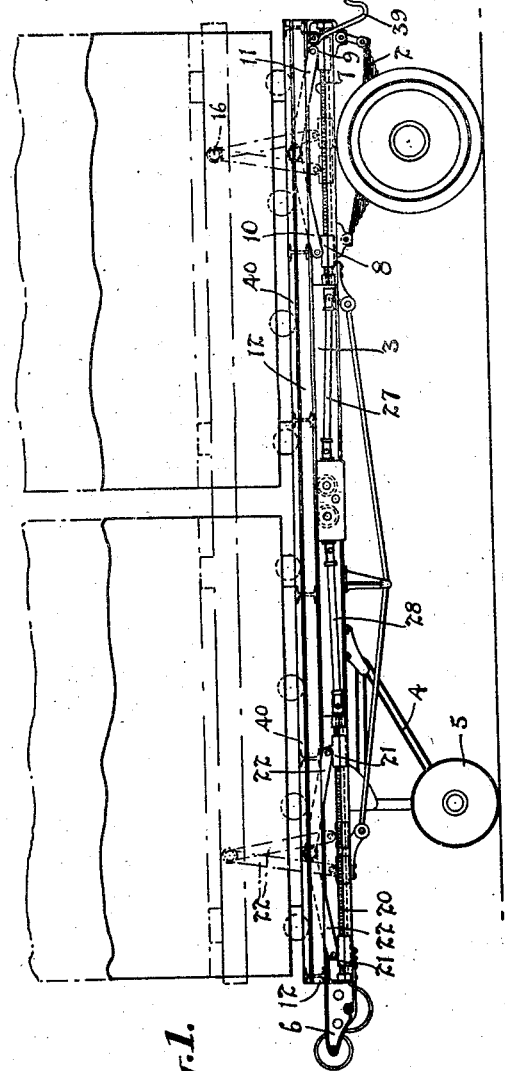
Figure 3:
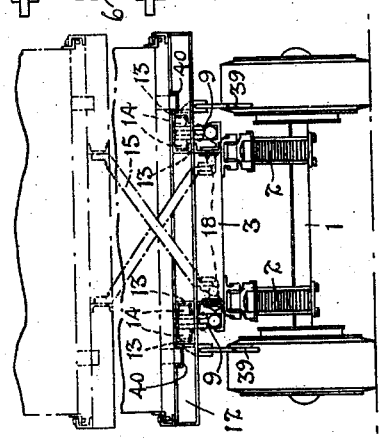
Figure 3 is a rear end elevation.
Figure 4:
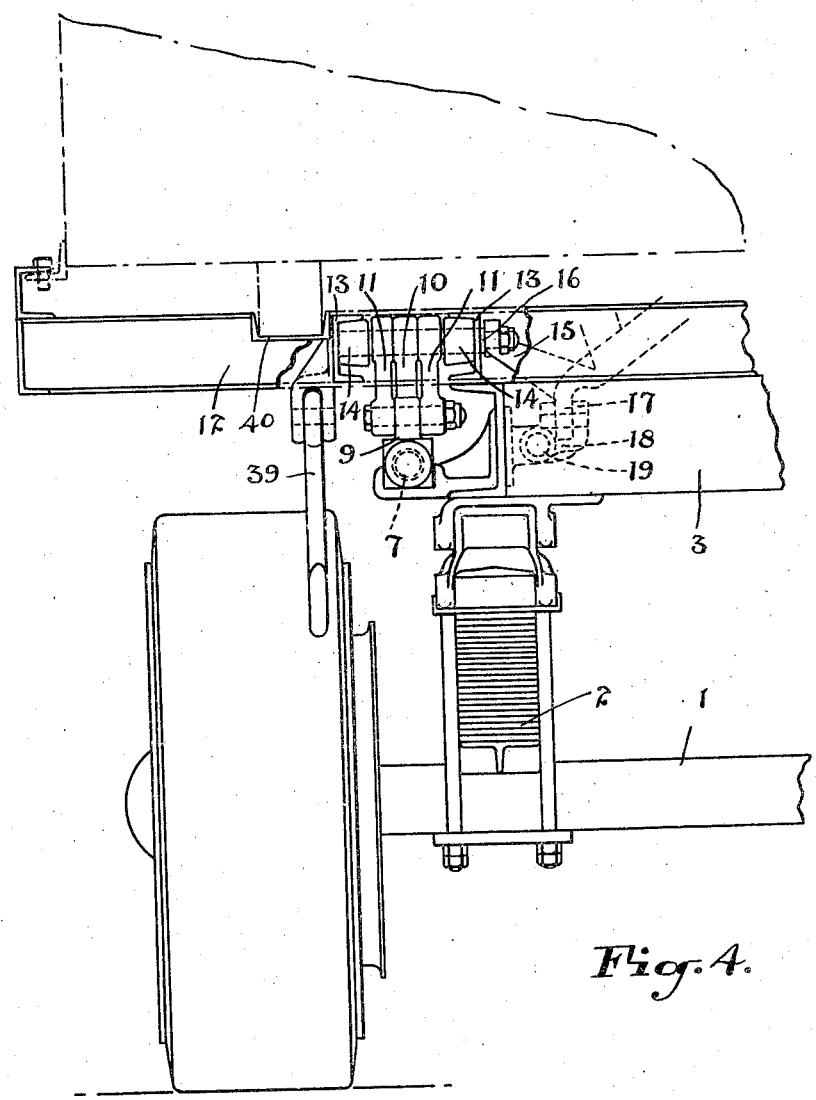
Figure 4 is an enlarged rear elevational detail of one of the roller supports for the platform carried by the elevating toggle, the transverse members of frame 12 being shown in section.

In the handling of "roll off" containers it is important to provide means for their ready transfer between highway trucks and the railroad cars upon which they are carried from rail-head to rail-head. On account of the variable heights existing between the level of the railroad car floors or of loading platforms and the adjacent roadway, the transfer of the containers is by existing methods rendered difficult.

The present showing of this invention is applied to a standard type of semi-trailer which has a main supporting rear axle 1 carrying on the springs 2 the rear end of the frame 3. The forward end of the frame 3 is supported by the rigid bracket 4 resting on the small truck wheels 5 when the truck is normally at rest.

The forward end of the truck is provided with a coupling structure 6 which is of a standard type to be attached to a tractor which raises the front end so that the truck wheels 5 are lifted clear of the ground.

Mounted within the frame structure 3 at the rear end are a pair of parallel longitudinally arranged shafts 7 each having a right hand thread at one end and a left hand thread at the other.

Sleeves 8 and 9 are threaded on the oppositely threaded ends of the shaft and to these sleeves are pivotally secured the toggle links 10 and 11 which have their free ends pivotally connected together.

A frame 12 superposed upon the frame 3 is provided with parallelly arranged channel bars 13 at its rear end and the pivot pins connecting the meeting ends of the links 10 and 11 have mounted on their ends rollers 14 which engage the flanges of the channel bars.

A cross frame 15 is pivotally connected at its inward end to the inner ends of the pivot pins 16 of the links 10 and 11 and the outward end of the cross frame is formed with lug ends 17 pivotally connected to blocks 18 slidably mounted on longitudinally and parallelly arranged bars 19.

It will be seen that upon the rotation of the threaded shafts 7 the sleeves 8 and 9 mounted thereon will be caused to travel toward or from each other, consequently moving the links 10 and 11 with a toggle motion to raise or lower their central point of connection upon which the super-structure frame 12 is carried.

The roller supports carried by the pivot pins 16 and engaging the longitudinal channel bars 13 of the frame 12 allow a relative longitudinal movement between the upper frame 12 and toggle and the cross frame rigidly supports the toggle and by means of the sliding blocks limits its endwise movement.

The front end of the frame is provided with a similar arrangement of threaded shafts 20, sleeves 21 and toggle links 22 but the pivot pins 23 of the toggle links are rigidly secured in the sides of the frame 12.

A supporting cross frame 24 similar to the frame 15 is connected to the inner ends of the pins 23 and is provided with blocks 25 slidably arranged on bars 26. The frames 15 and 24 brace the upper frame against transverse stresses.

The shafts 7 and 20 are connected respectively by universally jointed shafts 27 and 28 to bevel gears 29 and 30 journalled in a frame 31 mounted in the main frame 3 of the truck.

Cross shafts 32 and 33 are journalled in the frame 3 and each carry a bevel gear meshing respectively with the gears 29 and 30.

A universal gear drive 35 is arranged in a central frame 36 and driven from a shaft 37 which leads to a coupling (not shown) which is connected with the power shaft of the tractor device.

A suitable gear shift is provided that will drive either of the cross shafts 32 and 33 separately or together, as may be desired.

The central driving cross shaft 38 is extended out to the outer side of the frame and may be operated with a hand crank.

By the operation of the cross shafts and the consequent rotation of the threaded shafts at either end of the frame structure the upper frame 12 may be raised or lowered and it will be seen that by the manipulation of the drives the rear end may be raised without raising the front, or vice versa, or either may be lowered separately or with the other.

To the rear end of the upper frame 12 are attached a pair of hooks 39 which are adapted to be hooked over projections on the railway car or platform so as to limit the height of movement of the truck frame.

The upper truck frame is provided with channel tracks 40 in which the roller supports of the containers are adapted to rest. By hooking the rear end of the frame to the freight car or platform from which loaded containers are to be removed a tension may be placed upon the truck springs 2 which will offset the load of the containers as they are moved on to the truck, thus avoiding the sagging of the truck under the load when the containers are moved on to same.

The arrangement of the raising and lowering mechanism so that the front and rear ends can be operated independently is an important feature in that when unloading containers from a railway car or platform on to a truck, the forward end may be depressed sufficiently to form a downward grade for the container so that it may be moved with comparatively little or no effort. Likewise, when containers are being loaded on to cars or platforms from the truck, the forward end may be lifted higher than the rear end to give an impetus to the container which will avoid the expenditure of physical effort.

The structure is simple but very positive in its operation. The method of raising and lowering is strong and efficient and its use will greatly enhance the handling of containers.

What I claim as my invention is:

1. A truck having a rigid frame, a frame superposed on said truck frame, a plurality of arms supported from said truck frame connected to the superposed frame and adapted to operate with a swinging movement to raise and lower said superposed frame and to rigidly secure the same braced against longitudinal thrust, and means directly connected to said arms for operating said arms independently or in unison to raise or lower the frame.

2. A truck having a rigid frame, a frame superposed on said truck frame, a plurality of arms supported from said truck frame connected to the superposed frame and adapted to operate with a swinging movement to raise and lower said superposed frame and to rigidly secure the same braced against longitudinal thrust, and rotatable means directly connected to said arms for operating said arms independently or in unison to raise or lower the frame.

3. A truck having a rigid frame, a frame superposed on said truck frame, a plurality of arms pivotally supported from said truck frame and pivotally connected with said superposed frame and adapted to operate with a swinging movement to raise and lower said superposed frame and to rigidly secure same braced against longitudinal thrust, and threaded means directly connected to said arms for operating said arms independently or in unison to raise or lower the frame.

4. A truck having a rigid frame, a frame superposed on said truck frame, a plurality of swingable members adapted to rigidly support said superposed frame against longitudinal thrust when said frame is raised from said truck frame to variable positions either horizontal or tilted, and means directly connected to said members for selectively raising and lowering either or both ends of said superposed frame independently or in unison.

5. A truck having a rigid frame, a frame superposed on said truck frame, a plurality of swingable members adapted to rigidly support said superposed frame against longitudinal thrust when said frame is raised from said truck frame to variable positions either horizontal or tilted and rotatable means directly connected to said members for selectively raising and lowering either or both ends of said superposed frame independently or in unison.

6. A truck having a rigid frame, a frame superposed on said truck frame, a plurality of swingable members adapted to rigidly support said superposed frame against longitudinal thrust when said frame is raised from said truck frame in variable positions either horizontal or tilted, and threaded means directly connected with said members for selectively raising and lowering either or both ends of said superposed frame independently or in unison.

7. A truck having a rigid frame, a frame superposed on said truck frame, means mounted on the truck frame for selectively raising or lowering one end of said superposed frame, said means including a pivot journalled solely for rotation therein and secured in the superposed frame to hold it rigidly in various positions, and means for selectively raising or lowering the other end of said superposed frame.

8. A truck having a rigid frame, pairs of toggle members arranged longitudinally of said frame at each end thereof, a frame adjustably supported by said toggle members above the aforesaid frame in either angular or horizontal positions, and means for selectively operating said pairs of toggle members to raise or lower said superposed frame or to alter the angular or horizontal positions of the superposed frame.

9. A truck having a rigid frame, pairs of toggle members arranged longitudinally of said frame between the ends thereof, a frame adjustably supported by said toggle members above the aforesaid frame in either angular or horizontal positions, and means for selectively operating said pairs of toggle members to raise or lower said superposed frame or to alter the angular or horizontal positions of the superposed frame.

10. A truck having a rigid frame, a pair of parallel shafts arranged at each end of said frame and journalled longitudinally thereof and each having right and left threads, a pair of sleeves threaded on each of said threaded shafts, link members pivotally connected to each pair of sleeves on each shaft and pivotally connected together, a frame supported from the pivotally connected ends of said link members and adapted to be raised and lowered thereby, and means for operating said pairs of shafts to raise or lower the ends of the latter frame separately or in unison.

11. A truck having a rigid frame, a pair of parallel shafts arranged at each end of said frame and journalled longitudinally thereof and each shaft having right and left threads, a pair of sleeves threaded on each of said threaded shafts, link members pivotally connected to the oppositely arranged sleeves on each of said shafts and pivotally connected together, a supplemental frame pivotally connected at one end to the pivotal connection of one set of said link members and adjustably supported at the other end on the pivotal connection of the other set of said link members, and cross frames bracing said link members laterally.

12. A truck having a rigid frame, a pair of parallel shafts arranged at each end of said frame and journalled longitudinally thereof, said shafts having right and left threads, sleeves threaded on said threaded shafts, link members pivotally connected to the oppositely arranged sleeves on each shaft and pivotally connected together, a supplemental frame pivotally connected at one end to the pivotal connection of one set of said link members and adjustably supported at the other end on the pivotal connection of said link members, and cross bracing frames pivotally connected to said pivots and slidably connected to the main frame.

13. A truck having a rigid frame, a pair of parallel shafts arranged longitudinally of said frame, said shafts being each threaded right and left at opposite ends, sleeves threaded on said shafts, toggle links connected to said sleeves, a frame supported on said toggle links to be raised and lowered thereby, flexible shafts connected with the inward ends of said threaded shafts, cross shafts geared to the inward ends of said flexible shafts, and a change gear mechanism for controlling the operation of said cross shafts.

14. A truck comprising a rear axle supported on wheels, springs mounted on the rear axle, a frame mounted on said springs, a frame superposed above the aforesaid frame, means connected with the superposed frame and mounted on the under frame for raising and lowering the superposed frame, and means connected with the superposed frame for limiting its upward movement and effecting an application of tension on the springs supporting said frames.

15. A truck, comprising a rear axle supported on wheels, springs mounted on the rear axle, a frame mounted on said springs, a frame superposed above the aforesaid frame, means connected with the superposed frame and mounted on the under frame for raising and lowering the superposed frame, and a pair of hooks pivotally mounted on the superposed frame and adapted to be hooked on to an adjacent structure to limit the upward movement of the superposed frame.

16. A truck having a rigid frame, a pair of parallel shafts arranged at each end of said frame and journalled longitudinally thereof, said shafts each having right and left threads, a pair of sleeves threaded on each of said threaded shafts, link members pivotally connected to each pair of sleeves on each shaft and pivotally connected together at their outer extremities, a frame supported from the pivotally connected link members and adapted to be raised and lowered thereby, and control means interposed between said pairs of shafts for selectively operating the same.

17. A truck having a rigid frame, a pair of parallelly arranged shafts, journalled longitudinally in said frame and arranged at each end thereof, said shafts each having right and left threads, a pair of sleeves threaded on each of said threaded shafts, link members pivotally connected to each pair of sleeves on each shaft and pivotally connected together at their outer extremities, a frame mounted at one end on the connecting pivots of the adjacent link members, rollers mounted on the connecting pivots of the other link members and engaging said superposed frame in rolling contact, and means for operating said shafts to effect the raising or lowering of said latter frame.

WILLIAM PLATTS KELLETT.